May 13, 1952  S. D. ROBERTSON  2,596,288
HIGH-FREQUENCY PHASE MEASURING SYSTEM
Filed Oct. 20, 1948
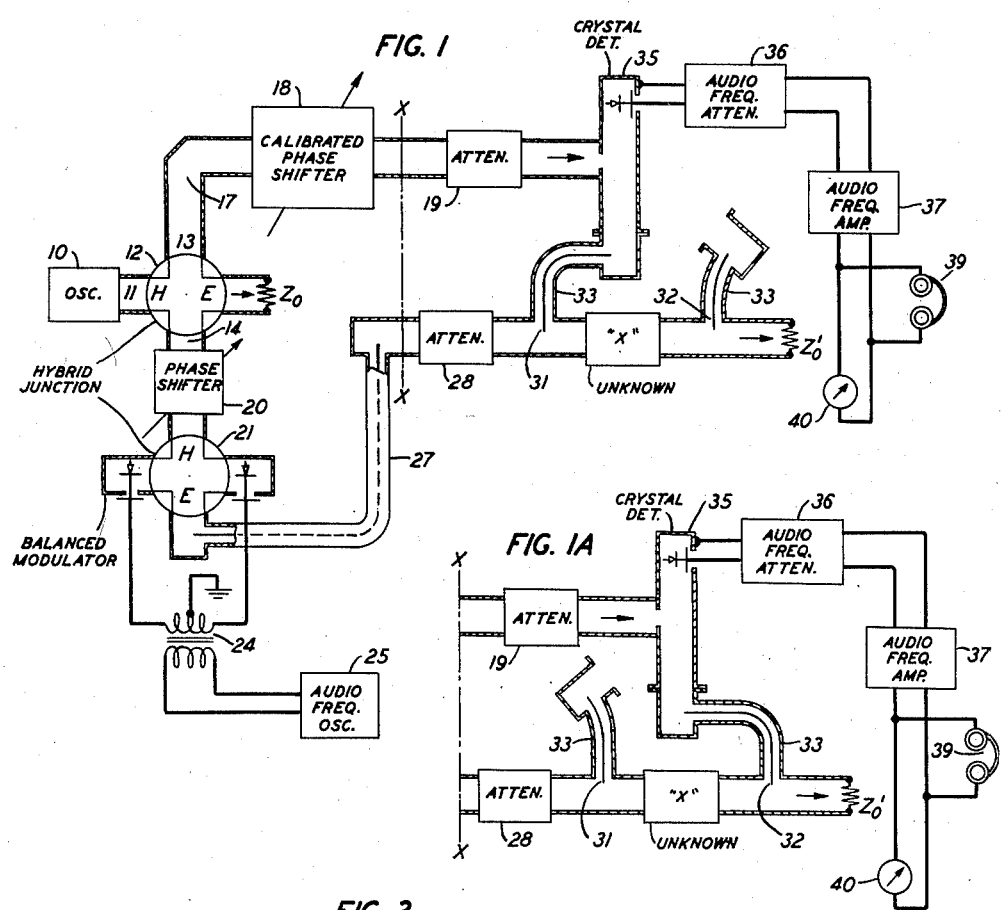
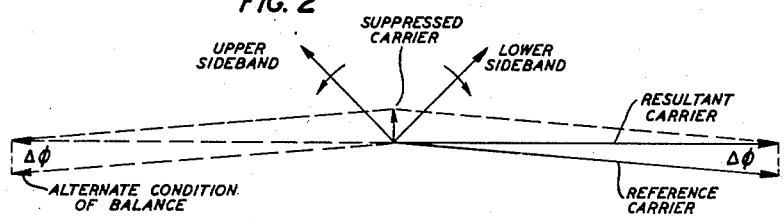
INVENTOR
S. D. ROBERTSON
BY
ATTORNEY Patented May 13, 1952

2,596,288

UNITED STATES PATENT OFFICE 2,596,288

HIGH-FREQUENCY PHASE MEASURING SYSTEM

Sloan D. Robertson, Red Bank, N. J., assignor to Bell Telephone Laboratories, Incorporated, New York, N. Y., a corporation of New York Application October 20, 1948, Serial No. 55,580

6 Claims. (Cl. 175—183)

This invention relates to methods of and systems for measuring electrical phase difference and more particularly for ascertaining phase shift at microwave frequencies.

An object of the invention is to provide an improved method of and system for measuring microwave phase differences in which it is unnecessary to compensate for amplitude inequalities between the signals whose phases are being compared.

Another object of the invention is to enable the measurement of the transfer impedance of an electrical transducer.

A commonly used technique for measuring phase is to sample the signal at the input and output of the device to be measured and to obtain a null balance between the two signals by varying the phase of one signal by a known amount. If the two samples are not of nearly equal magnitudes, it is necessary to attenuate the larger one with an attenuator of known phase shift. The latter operation presents difficulties since the additional phase shift introduced by the attenuator is usually unknown.

The method of the present invention overcomes these difficulties by permitting measurements to be made with signal samples of unequal magnitudes and has other salient features and attendant advantages as pointed out hereinafter. The method uses the homodyne detection principle and operates in the following manner. Energy from a source of high frequency oscillations is divided in two portions, one of which becomes the homodyne or reference carrier. The other portion is suppressed during modulation with an audio frequency signal to produce a double-sideband signal. Either the double-sideband signal or the homodyne carrier is applied to the exclusion of the other to the device whose phase is to be measured, from which input and output samples are derived and alternately demodulated by the excluded quantity. A balance or reference condition is established by adjusting the phase of either the homodyne carrier or the double-sideband signal an amount which will make the recovered audio frequency signal disappear in the audio output. This occurs when the phase of the homodyne carrier is in quadrature with the signal sidebands. The difference in phase between successive phase adjustments is equal to the phase difference between the two samples. Another reference or balance condition may be established when the homodyne carrier is in phase coincidence with the sampled signal sidebands. In this case balance will be indicated when the recovered audio signal in the detector output is a maximum. When balance is to be determined aurally, however, it is desirable to use the null method to determine the exact point of balance since it is much simpler to discern the absence of a signal than to distinguish between signals of high intensity.

The invention will be better understood by reference to the following specification and accompanying drawings in which:

Fig. 1 is a schematic circuit diagram of one embodiment of the invention in operating condition shown connected to the input of the device whose phase is to be measured.

Fig. 1A shows the microwave phase measurement scheme of Fig. 1 connected to the output of the device whose phase is to be measured.

Fig. 2 is a vector diagram of balanced conditions in the phase measuring circuits of Figures 1 and 1A.

In Fig. 1 power from a microwave oscillator 10 is applied to the H-plane branch 11 of a hybrid junction 12 where it divides and emerges in equal portions from the lateral branches 13, 14. The hybrid junction may be of the type disclosed in Patent 2,445,896 granted July 27, 1948, to W. A. Tyrrell. That portion of the power appearing in the wave-guiding passage 17 connecting the lateral branch 13 of the hybrid junction with the calibrated variable phase shifter 18 becomes the homodyne carrier. The remaining portion of the oscillator power is applied through a second variable phase shifter 20 to a balanced crystal modulator 21. The second phase shifter 20 need not be calibrated and serves to eliminate the adverse effects of reflected power due to any imperfect balance in the modulator. The crystal modulator 21 may be of the type embodied in a wave-guide hybrid junction as shown in Fig. 16, page 1191 of the article entitled "Microwave Converters" by C. F. Edwards, appearing in the Proceedings of the I. R. E., vol. 35, No. 11, pages 1181–1191, November 1947.

The portion of the power which enters the modulator 21 is modulated by a signal derived from a suitable audio frequency oscillator 25 generating sinusoidal oscillations of a frequency of 1000 cycles per second, for specific example. The signal is applied to the modulator through transformer 24. The suppressed carrier, double-sideband signal which leaves the modulator 21 by way of the coaxial line 27 is applied after an attenuation of some twenty to thirty decibels in attenuator 28 to the input of the device "X,"

the unknown, whose phase or transfer impedance is to be measured. Probes are provided at the input 31 and output 32 of the test device "X" for sampling the signal. Provision is made for connecting either probe by way of flexible coaxial lines 33 to a crystal detector 35 of the type used for detecting an amplitude-modulated signal and described in connection with Fig. 12, page 1189 of the November 1947 Proceedings of the I. R. E., supra. A balanced crystal detector identical in construction with the balanced modulator 21 may be employed in place of the unbalanced detector 35 shown in Fig. 1 to eliminate harmonics of the audio tone generated in the detector. The homodyne carrier emerging from the calibrated phase shifter 18 is attenuated at 19 to a level of about 1 milliwatt before it is applied to crystal detector 35. The output of the detector is connected to an audio frequency amplifier 37 terminated by a pair of headphones 39 or an output meter 40. An audio frequency attenuator 36 may be placed between the amplifier and the detector as an aid in measuring the amplitude of a transfer impedance.

An ordinary vane-type variable attenuator may be made to serve as a satisfactory phase shifter by replacing the resistance strip with a polystyrene vane. Other phase shifters can be used with equally satisfactory results. It is desirable, however, that each of the two phase shifters be impedance matched to the line in which it is located in order that reaction back on the oscillator shall be a minimum.

The procedure for adjusting the apparatus and measuring phase is as follows:

With both sampling probes 31, 32 disconnected from the detector 35 the variable phase shifter 20 between the oscillator 19 and the modulator 21 is adjusted until the output of the detector is zero or a minimum. This balances out the effect of any signal reflected into 17 by the modulator 21 by establishing a quadrature condition between the reflected signal and the homodyne carrier so that an audible signal will not be produced in the audio output. The input probe 31 is then connected to the detector 35, as illustrated at Fig. 1 and the calibrated phase shifter 18 is adjusted until the signal disappears in the headphones 39. When this occurs the homodyne carrier is in quadrature with the signal sidebands, and the resultant signal applied to the detector 35 is equivalent to a phase-modulated wave having a low modulation index, i. e., a narrow cyclical angular variation such that the amplitude of the resulting wave is substantially constant. Such a wave consequently is not demodulated by an ordinary amplitude modulation detector of the type used here.

The input probe 31 is then disconnected from the detector 35 and the output probe 32 connected as illustrated at Fig. 1A. The phase shifter 18 is again adjusted for a null in the audio output. The difference in phase between the adjustments of the calibrated phase shifter 18 is equal to the phase shift between the input and output of the device under test. If the probes are not located exactly at the input and output terminals of the unknown it may be necessary to make a correction in the measured phase by allowing for the known phase shift in the line between the probes and the actual terminals of the unknown.

The same apparatus is readily adapted for measurement of transfer impedances where it is necessary to know the ratio of the magnitudes of an output and an input voltage as well as their phase difference. The procedure for adjusting the apparatus is the same as that described above. To measure the input-output magnitude ratio and the phase of the transfer impedance the input probe 31 is connected to the detector 35 and the calibrated phase shifter 18 is adjusted until the magnitude of the recovered audio frequency signal indicated by the output meter 40 is a maximum. When this occurs the homodyne carrier is in phase coincidence with the signal sidebands and the resultant signal applied to the detector is essentially a pure amplitude-modulated wave and, therefore, will be completely detected.

The input probe 31 is then disconnected from the detector and the output probe 32 connected. The calibrated phase shifter 18 is again adjusted for the maximum indication on the output meter 40. The two readings on the scale of the output meter are proportional to the input and output voltages of the transfer impedance, while the difference in phase between the adjustments of the calibrated phase shifter 18 will be equivalent to their phase difference. The transfer impedance is then given by the relation $$Z_{12} = \frac{V_1}{V_2} Z_0 1$$

where $V_1$ and $V_2$ are the complex values of the input and output voltages, respectively, as determined above. The phase difference may also be obtained separately by employing the null method described above. However, this requires a separate set of measurements.

Where it is desired to measure the transfer impedance of an amplifier, for example, it may be necessary to employ an audio frequency attenuator 36 in the detector output in order that both the input and the output voltages of the amplifier may be indicated on the same output meter.

Certain precautions are necessary if highest accuracy is to be achieved. It may be found in practice that the carrier is not completely suppressed in the output of the balanced modulator. It may be at a level of the order of ten to twenty decibels below the signal sidebands. The residual carrier will in such case be added to the homodyne or reference carrier in the detector output so that a null adjustment will be reached when the resultant of the residual and reference carriers is in quadrature with the signal sidebands. As a result an error in phase $\Delta\Phi$ will be introduced in the measurements as shown in the vector diagram of Fig. 2. It is therefore desirable that the residual carrier be low in level compared with the homodyne carrier. With the aid of attenuator 28 a difference in level of about forty decibels may be obtained between the homodyne and residual carriers, and the error may be confined to half a degree. The homodyne method of detection has all the conversion efficiency of the usual double detection arrangements, and in addition has the advantage in this particular application of having a low noise level due to the relatively narrow band required for the audio signals. The forty decibel level difference mentioned above is accordingly not a serious handicap.

It may be further observed that the homodyne carrier can be brought in quadrature with the signal for two different phases 180 degrees apart. This is illustrated in Fig. 2. In many applications, where only the variation in phase difference is of importance, this uncertainty of 180 degrees can be ignored. The correct setting of the homodyne carrier phase can, however, be determined very easily. Assume that the input probe 31 is connected to the detector 35 and that the phase has been adjusted for a balance. If one then disconnects the audio frequency drive 25 from one of the crystals in the balanced modulator 21, the residual carrier will no longer be suppressed and the error angle $\Delta\Phi$ of Fig. 2 will become larger. Whether the homodyne carrier is lagging or leading the signal carrier can be determined by observing whether more or less phase shift, respectively, must be introduced to restore balance. A similar test performed with the output probe will indicate whether or not it is necessary to add 180 degrees to the measured phase difference. If either probe indicates a lead, whereas the other probe indicates a lag, then the addition of 180 degrees is indicated.

In microwave circuits it frequently happens that the transfer phase varies quite rapidly with the frequency, particularly if some part of the circuit is at or near resonance. In measuring the phase characteristics of a circuit of this type over a band of frequencies it is necessary therefore to take the points of measurement close enough together to avoid phase errors corresponding to multiples of 360 degrees.

Although a specific embodiment of the invention has been shown and described, it will be understood that it is but illustrative and that various modifications may be made therein without departing from the scope of the invention as defined in the appended claims.

What is claimed is:

1. A method of measuring phase in which the phase shift produced by a device of unknown phase is determined by comparing the phase difference between two electrical quantities one of which comprises a sinusoidal high frequency carrier wave and the other a suppressed-carrier double-sideband signal, said method including the steps of deriving said suppressed-carrier double-sideband signal from said high frequency carrier wave and a low frequency sinusoidal signal, passing one of said quantities through said device to the exclusion of the other, successively combining said excluded quantity with input and output samples of said quantity passing through said device, adjusting the phase relationship between said quantities a measurable amount to establish a phase quadrature condition therebetween and to produce upon each of said successive combinations a phase modulated wave of low modulation index, detecting the amplitude variations of said phase modulated waves resulting from said successive combinations, and indicating a null balance condition each time said quantities are adjusted to phase quadrature.

2. A method of measuring phase shift produced by electrical test apparatus at microwave frequencies by comparing the phase difference between a sinusoidal carrier wave of microwave frequency and a suppressed-carrier double-sideband microwave signal which includes the steps of modulating said carrier wave with a sinusoidal audio frequency signal to obtain said suppressed-carrier double-sideband signal, passing said double-sideband signal through said electrical test apparatus, successively combining said carrier wave with input and output samples of said double-sideband signal passing through said electrical test apparatus, adjusting the phase relationship of said carrier wave a measurable amount relative to said double-sideband signal to establish a phase quadrature condition therebetween and to produce a phase modulated wave of substantially constant amplitude having a narrow cyclical angular variation, detecting the amplitude variations of said phase modulated waves resulting from said successive combinations and indicating a null balance condition each time said carrier wave and said double-sideband signal samples are adjusted to phase quadrature.

3. A phase measuring system in which the phase shift produced by a device of unknown phase is determined by comparing the phase difference between two electrical quantities, said system comprising the combination of a source of sinusoidally varying high frequency carrier waves for supplying one of said quantities, a separate source of low frequency signals, means for deriving a second quantity from said carrier waves and said low frequency signals, said second quantity comprising a suppressed-carrier double-sideband signals, means for passing one of said quantities through said device to the exclusion of the other, means for successively combining said excluded quantity with input and output samples of said quantity passing through said device, phase shifting means for adjusting the phase relationship between said quantities a measurable amount upon each of said successive combinations, detecting means connected to said combining means and responsive only to amplitude variations of waves applied thereto, and means for indicating a null balance condition each time said quantities are adjusted to phase quadrature.

4. A system for measuring phase shift produced by electrical test apparatus at microwave frequencies comprising the combination of an ultra-high frequency source of sinusoidal carrier waves, a source of sinusoidal audio frequency signals, means for modulating said carrier waves with said audio frequency signals to produce a suppressed-carrier double-sideband signal, means for passing said double-sideband signal through said electrical test apparatus, means for successively combining said carrier waves with input and output samples of said double-sideband signal passing through said electrical test apparatus, phase shifting means connected to adjust the phase of said carrier waves a measurable amount relative to said double-sideband signal upon each of said successive combinations, detecting means connected to said combining means and responsive only to amplitude variations of waves applied thereto, and means for indicating a null balance condition each time said carrier waves and said double-sideband signal samples are adjusted to phase quadrature.

5. In combination, a microwave oscillator supplying sinusoidally varying waves of carrier frequency, means connected to said oscillator for dividing the output thereof into two equal portions, modulating means comprising a balanced modulator and a source of sinusoidal audio frequency signals connected thereto, said modulating means being connected to receive one portion of the output of said microwave oscillator and to produce a suppressed-carrier double-sideband signal, a device of unkonwn phase shift connected to receive said double-sideband signal, a detector of amplitude modulated waves, means for successively applying input and output samples of said double-sideband signal passing through said device to the input of said detector, a calibrated phase shifter connected to receive the other portion of the output of said microwave oscillator, means for supplying said carrier frequency waves applied to said phase shifter to the input of said detector to be successively combined therein with said input and output samples of said double-sideband signal, and indicating means connected to the output of said detector to indicate a null balance condition each time said carrier frequency waves and said double-sideband signal samples are adjusted to phase quadrature.

6. In combination, a microwave oscillator, a hybrid junction connected to said oscillator for dividing the output thereof into two equal portions and supplying said portions to two paths, one of said paths including an adjustable calibrated phase shifter and a detector of amplitude modulated waves and a null indicator, the other of said paths including a variable phase shifter and a balanced modulator having a sinusoidal audio frequency source connected thereto and a device of unknown phase shift, and sampling probes connected to the input and output of said device and adapted to be alternately connected to the input of said detector.

SLOAN D. ROBERTSON.

REFERENCES CITED

The following references are of record in the file of this patent:

UNITED STATES PATENTS

| Number | Name | Date |
|---|---|---|
| 2,209,064 | Nyquist | July 23, 1940 |
| 2,324,215 | Kinsburg | July 13, 1943 |
| 2,405,430 | Kent | Aug. 6, 1946 |
| 2,416,310 | Hansen et al. | Feb. 25, 1947 |
| 2,416,517 | Farrow | Feb. 25, 1947 |
| 2,432,214 | Sontheimer | Dec. 9, 1947 |